(12) United States Patent
Stevens et al.

(10) Patent No.: US 12,444,435 B1
(45) Date of Patent: Oct. 14, 2025

(54) HARD DISK DRIVE WITH A COMPONENT THAT INCLUDES LIQUID CRYSTAL POLYMER

(71) Applicant: SEAGATE TECHNOLOGY LLC, Fremont, CA (US)

(72) Inventors: Daniel R. Stevens, Longmont, CO (US); Paul S. Tyler, Apple Valley, MN (US); Michael Yi Zhao Yao, Singapore (SG); Wanvisa Rattanangam, Bangkok (TH); Nipata Nonphonkrang, Nakhon Ratchasima (TH); Tsuny Ming Boh, Singapore (SG); Kevin J. Kolb, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/583,138

(22) Filed: Feb. 21, 2024

Related U.S. Application Data

(60) Provisional application No. 63/491,910, filed on Mar. 23, 2023.

(51) Int. Cl.
*G11B 5/00* (2006.01)
*G11B 5/40* (2006.01)
*G11B 33/14* (2006.01)

(52) U.S. Cl.
CPC ............ *G11B 5/40* (2013.01); *G11B 33/1446* (2013.01); *G11B 2005/0021* (2013.01)

(58) Field of Classification Search
CPC ....... G11B 5/00; G11B 5/5565; G11B 5/5569; G11B 19/2009; G11B 21/22; G11B 25/043; G11B 33/1406; G11B 5/314
USPC .......................................................... 360/75
See application file for complete search history.

(56) References Cited

U.S. PATENT DOCUMENTS 9,361,918 B2 * 6/2016 Noda ...................... C09K 21/14

\* cited by examiner

*Primary Examiner* — Nabil Z Hindi
(74) *Attorney, Agent, or Firm* — Mueting Raasch Group

(57) ABSTRACT

A heat-assisted magnetic recording hard disk drive includes a heat-assisted magnetic recording head and a component. The heat-assisted magnetic recording head and the component are disposed in an interior volume of the heat-assisted magnetic recording hard disk drive. The component includes liquid crystal polymer. The component has an outgassing rate that is less than about 300 nanograms per gram.

19 Claims, 7 Drawing Sheets

HARD DISK DRIVE WITH A COMPONENT THAT INCLUDES LIQUID CRYSTAL POLYMER

RELATED APPLICATIONS

This application claims the benefit of U.S. Provisional Patent Application No. 63/491,910, filed on Mar. 23, 2023, which provisional patent application is incorporated herein by reference in its entirety to the extent that it does not conflict with the present disclosure.

TECHNICAL FIELD

The disclosure relates to components of a hard disk drive.

SUMMARY

A hard disk drive (HDD) includes components that are disposed in an interior volume of the HDD. Water vapor, organic particulates, and organic vapor from outgassing that are present in the interior volume of the HDD may, in various scenarios, compromise performance of the HDD by contaminating, degrading, and/or damaging components such as magnetic recording heads. In some instances, materials that are used to produce components of the HDD have associated water levels and outgassing rates. Some HDDs, like heat assisted magnetic recording (HAMR) HDDs, may be particularly sensitive to both water and outgassing.

The present disclosure describes a hard disk drive (HDD) having a component that includes liquid crystal polymer. Liquid crystal polymer may have a characteristically low water level when compared to other materials that may be used to produce the component. Further processing the component through a bake process may reduce the outgassing rate of the component, thus providing a component that has both low water level and low outgassing. Such a component may be suitable for use in an HDD such as a HAMR HDD that is sensitive to both water and outgassing.

In one example, a heat-assisted magnetic recording hard disk drive encloses in an interior volume a heat-assisted magnetic recording head along with a component that includes a liquid crystal polymer that has an outgassing rate that is less than about 300 nanograms per gram. In certain aspects, the component may be a bracket, a diverter, or other such component.

In another example, a method of extending an operating life of a heat-assisted magnetic recording hard disk drive by reducing degradation of a heat-assisted magnetic recording head of the heat-assisted magnetic recording hard disk drive includes the steps of providing the heat-assisted magnetic recording head; providing a component of the heat-assisted magnetic recording hard disk drive, the component including liquid crystal polymer; exposing the component to an environment having a temperature that is at least about 110 degrees Celsius for a duration of least 2 hours; and disposing the heat-assisted magnetic recording head and the component in an interior volume of the heat-assisted magnetic recording hard disk drive.

These and other features and aspects of various examples may be understood in view of the following detailed discussion and accompanying drawings.

DETAILED DESCRIPTION

Figure 1A:
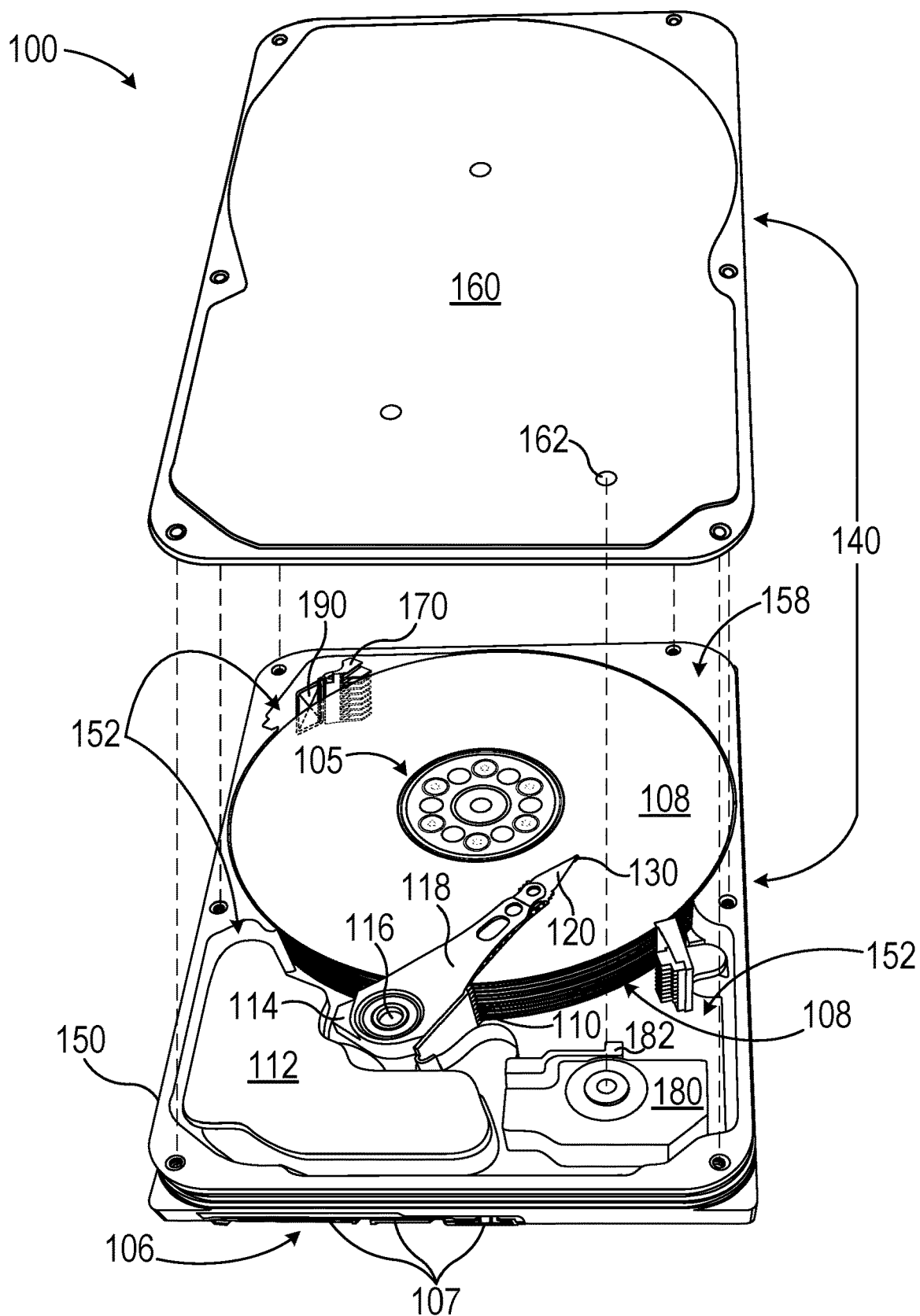
FIG. 1A is a perspective view of an example hard disk drive, in accordance with aspects of this disclosure.
Figure 1B:
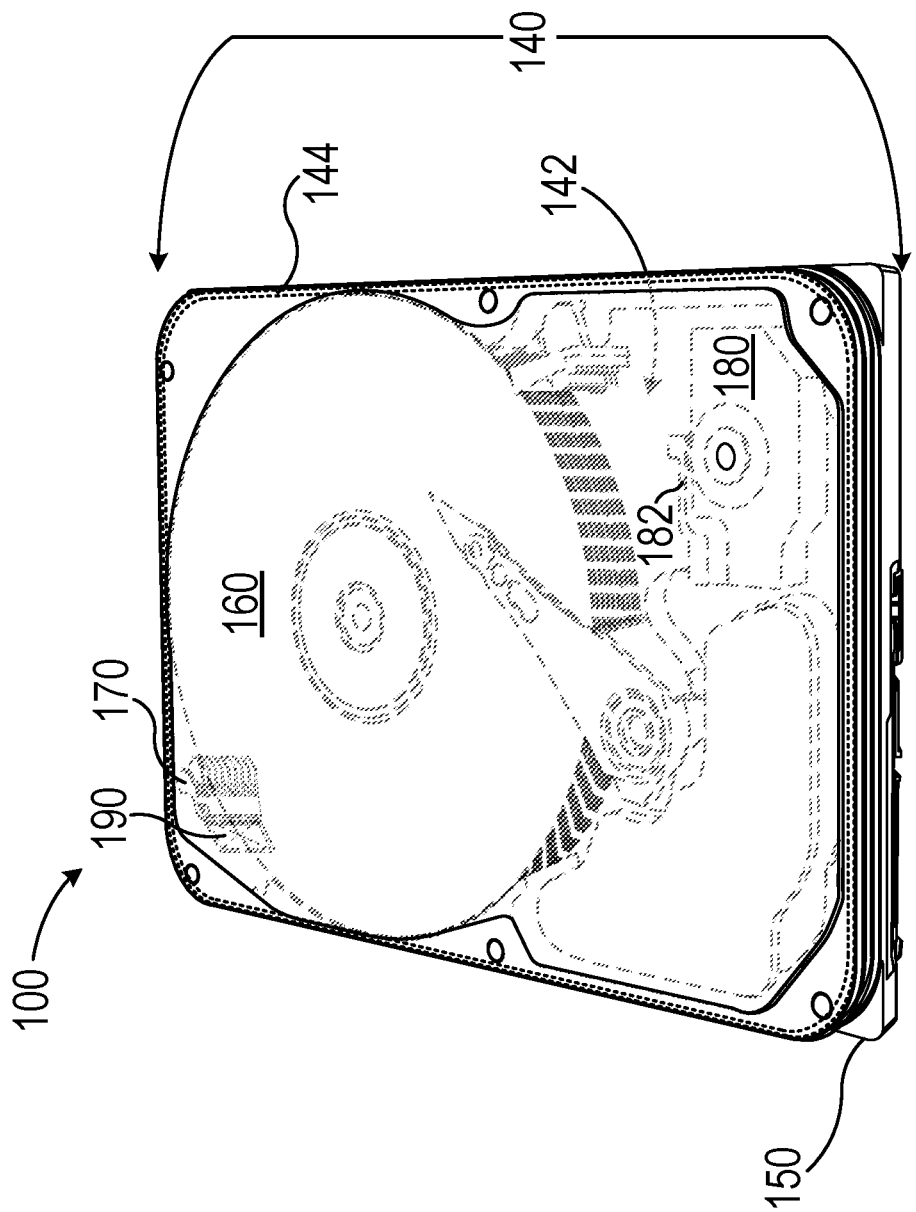
FIG. 1B is a perspective view of an example hard disk drive, in accordance with aspects of this disclosure.

FIGS. 1A and 1B are perspective views of an example hard disk drive (HDD), in accordance with aspects of this disclosure. HDD 100 includes an enclosure 140 configured to contain components of HDD 100. Enclosure 140 includes a base 150 and a top cover 160. Base 150 includes a recess 152 to accommodate components of HDD 100. HDD 100 further includes a printed circuit board assembly (PCBA) 106. PCBA 106 of this example is coupled to base 150 and includes a plurality of input/output connectors 107 that are each configured to provide an interface between one or more components of HDD 100 and one or more host devices (e.g., a computer, a server, a consumer electronic device, etc.).

Base 150 may be formed from any suitable material, such as metal (e.g., aluminum), plastic, or other suitable material or combinations thereof. In some examples, base 150 comprises multiple components, such as an outer frame and a bottom cover, that are coupled together (e.g., by screws, by welding). Top cover 160 is configured to couple to base 150 to enclose components of HDD 100. FIG. 1B shows assembled HDD 100, with top cover 160 aligned with and coupled to a surface of base 150 (a surface 158 of FIG. 1A) to form an interior volume 142 of HDD 100. Components of HDD 100 described herein may be disposed in interior volume 142. Components other than those illustrated or specifically identified in FIGS. 1A and 1B and described herein are contemplated and may be disposed in interior volume 142.

Top cover 160 can be coupled to base 150 using any suitable technique, such as using one or more screws, connection fingers, locking/clipping structures, adhesives, rivets, other mechanical fasteners, welding (e.g., ultrasonic welding) or combinations thereof. In some examples, HDD 100 includes a seal 144 disposed between base 150 and top cover 160 and configured to seal interior volume 142 of HDD 100. In some examples, seal 144 is a weld formed between base 150 and top cover 160. In some examples, seal 144 is a form-in-place gasket (FIPG). One example of a FIPG is an epoxy (e.g., a two-part epoxy) that is applied along an outer edge of top cover 160 or base 150 and thermally cured after coupling top cover 160 to base 150.

In some examples, a gas mixture may be added to interior volume 142 after coupling top cover 160 to base 150. The gas mixture may be introduced into interior volume 142 by way of an inlet 162 in top cover 160. The gas mixture of HDD 100 may include helium and/or other gases (e.g., oxygen). Helium may be included in an HDD to reduce mechanical vibrations, particularly of HGAs of the HDD. Including helium in an HDD may enable lower head-media spacing (HMS) between a reader and/or writer of a magnetic recording head and a magnetic disk, and thus a higher areal density capability (ADC) of the HDD.

HDD 100 includes a head stack assembly (HSA) 110 and one or more magnetic disks 108 configured to store bits of data. HSA 110 includes a plurality of head gimbal assemblies (HGA) 120. Each HGA 120 includes a magnetic recording head 130. Each magnetic recording head 130 is configured to read data from and write data to a surface of a magnetic disk 108. Each magnetic recording head 130 includes a reader and a writer. Other components of a magnetic recording head 130 (e.g., heaters, heat sinks, piezoelectric actuators) are contemplated. HDD 100 of FIGS. 1A and 1B may be a heat assisted magnetic recording (HAMR) HDD. In the example of a HAMR HDD, a magnetic recording head 130 may be a heat assisted magnetic recording (HAMR) head and may include a light source such as a laser, a waveguide, and a near-field transducer (NFT) that is configured to heat and lower the coercivity of magnetic grains in a spot of focus on a magnetic disk 108.

A motor assembly 105 is configured to rotatably support magnetic disks 108 and circumferentially rotate magnetic disks 108 about an axis of rotation during operations of HDD 100. Magnetic disks 108 are mounted on motor assembly 105 such that an annular volume of each magnetic disk 108 encircles a portion of motor assembly 105. Motor assembly 105 may rotate magnetic disks 108 during an operation of HDD 100 such that each magnetic disk 108 moves relative to a respective magnetic recording head 130 to enable the magnetic recording head 130 to read data from and/or write data to the magnetic disk 108.

A voice coil drive actuator 112 produces a magnetic field that exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus magnetic recording heads 130, to move relative to magnetic disks 108. HDD includes a diverter 170 that is proximal to magnetic disks 108 and is configured to divert helium and/or other interior gas mixture to reduce windage on rotatable drive actuator arms 118. Reducing windage on rotatable drive actuator arms 118 may reduce undesired vibrations that may cause a magnetic recording head 130 to move off track and/or contact a magnetic disk 108. While HDD 100 utilizes voice coil drive actuator 112 to move HGAs 120 relative to magnetic disks 108, other means of moving HGAs 120, such as a voice coil motor (VCM) or ultrasonic motor (USM), are contemplated.

Moisture and/or organic contamination in an interior volume of an HDD may lead to reduced performance (e.g., reduced areal density capability) and/or reduced lifetime of the HDD. Water vapor, organic particulates, and organic vapor from outgassing may, in various scenarios, compromise performance of an HDD by contaminating, degrading, and/or damaging components such as magnetic recording heads. An HDD may include one or more components configured to mitigate moisture and/or organic contamination. HDD 100 of FIGS. 1A and 1i, for example, includes an environmental control module (ECM) 180 and a recirculation filter 190. ECM 180 is coupled to enclosure 140 by a bracket 182. ECM 180 may include a desiccant that is configured to reduce moisture in interior volume 142 of HDD 100 illustrated in FIG. 1B. ECM 180 may further include an adsorbent (e.g., activated carbon) that is configured to trap organic contaminants to mitigate organic contamination of components of HDD 100 (e.g., magnetic recording head(s) 130). ECM 180 may include an inlet seal with a filter that is configured to remove particle contamination from a gas mixture that is fed into interior volume 142.

Recirculation filter 190 filter of this example is coupled to diverter 170. Recirculation filter 190 may be configured to remove particles and/or trap organic contaminants from recirculated air or gas (e.g., a gas mixture that includes helium) of interior volume 142 of HDD 100.

Some HDDs may be particularly sensitive to water and/or outgassing. A magnetic recording head of a HAMR HDD (hereafter, a HAMR head), for example, may include materials and/or features that are especially sensitive to contamination. Organic contaminants from outgassing of materials in an HDD, for example, may react and form carbonaceous deposits on components of the HDD such as a magnetic recording head, potentially compromising write and/or read performance of the magnetic recording head. In some instances, carbonaceous deposits on an NFT of a HAMR head may increase the laser power that is required to lower coercivity of magnetic grains of a magnetic disk, thus increasing the operating temperature and potentially leading to premature failure of the HAMR head. Certain outgassing products, such as those that are byproducts of hydrolysis reactions between water vapor and materials in the HDD (e.g., outgassed alcohols, outgassed hydrocarbons), may degrade materials, interfaces, and/or features of an NFT and/or other component, potentially reducing write performance of the associated HAMR head. While HAMR HDDs may include means of mitigating contamination (e.g., ECM 180 and recirculation filter 190 of FIGS. 1A and 1), further methods of controlling contamination are of interest when considering the sensitivity of HAMR HDDs to contaminants.

In accordance with aspects of this disclosure, a component disposed in interior volume 142 of HDD 100 includes liquid crystal polymer. Liquid crystal polymers are a category of materials that demonstrate some level of crystallinity, such as molecular ordering, in the liquid or flow state. Some liquid crystal polymers, known as thermotropic liquid crystal polymers, demonstrate such crystalline properties above a first temperature. In some instances, a thermotropic liquid crystal polymer is characterized by this first temperature and a second temperature. In the range from the first temperature to the second temperature, which may be referred to as a flow temperature range, the liquid crystal polymer is in a mesophase and exhibits properties of a liquid with some amount of molecular crystallographic alignment and/or ordering. This characteristic temperature range may enable the liquid crystal polymer to be processed as a thermoplastic using traditional manufacturing methods such as injection molding. The crystalline characteristics of the liquid crystal polymer may be maintained upon cooling, in some instances providing a manufactured article with exceptional strength, thermal resistance, wear resistance, chemical resistance, electronic properties, and/or other properties when compared with similar articles manufactured with materials that are not liquid crystal polymer. Commercially available liquid crystal polymers include Vectra, Xydar, Ekonol, and Rodrun, among others. Other liquid crystal polymers, including those that transition into a molecularly ordered liquid state with the addition of a solvent (e.g., lyotropic liquid crystal polymers), are contemplated and are considered to be within the scope of this disclosure.

Utilizing liquid crystal polymer to produce a component disposed in interior volume 142 of HDD 100 may provide that component with exceptionally low water level when compared to other materials that may be used to produce the component. This characteristic low water level may be particularly favorable for HDDs that are sensitive to contamination and byproducts of hydrolysis reactions between water and materials of the HDD. A component of HDD 100 that includes liquid crystal polymer (e.g., a component disposed in interior volume 142) may have a water level that is less than about 0.08 percent. In some examples, a component of HDD 100 that includes liquid crystal polymer has a water level that is less than about 0.05 percent or about 0.02 percent.

A component that includes liquid crystal polymer may not have an inherently low outgassing rate. Therefore, simply producing a component of an HDD with liquid crystal polymer may not provide sufficient benefit over other materials. However, as described herein, a process that includes baking a component that includes liquid crystal polymer may significantly reduce outgassing of the component while maintaining low water level. That is, a component of HDD 100 that includes liquid crystal polymer and has been baked according to methods described herein may demonstrate both low water level (e.g., less than 0.08 percent) and low outgassing rate (e.g., less than about 300 nanograms per gram), making this a favorable choice of material and process for manufacturing a component of HDD 100. In an example where HDD 100 is a HAMR HDD, utilizing a component that includes liquid crystal polymer and has been baked according to the methods described herein may reduce degradation of one or more HAMR heads 130 of HAMR HDD 100 and may extend the operating life of HAMR HDD 100.

In some examples, a filler is embedded in the liquid crystal polymer of the component. A filler may be included to increase hardness, rigidity, strength, chemical resistance, and/or wear resistance; improve manufacturability; or, in some instances, to lower cost. Examples of fillers that may be embedded in the liquid crystal polymer include glass (e.g., fibers), mica, carbon fibers, carbon particles, and graphite.

Figure 2:
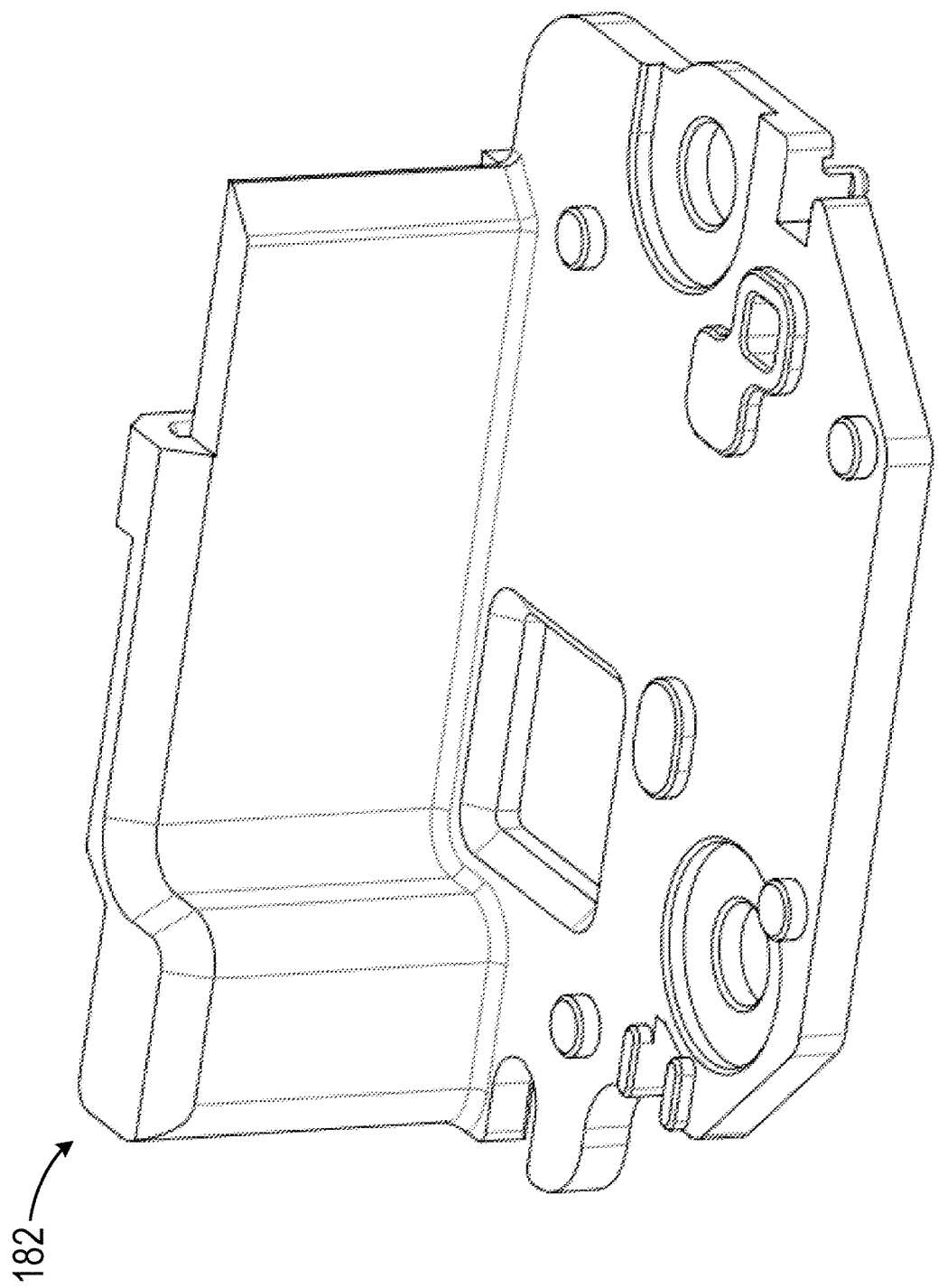
FIG. 2 is a view of an example bracket of a hard disk drive, in accordance with aspects of this disclosure.

FIG. 2 is a view of an example bracket of a hard disk drive, in accordance with aspects of this disclosure. Bracket 182 of FIG. 2 is one example of bracket 182 of FIGS. 1A and 1B. Bracket 182 is configured to couple an ECM (e.g., ECM 180 of FIGS. 1A and 1B) and/or other component(s) to an enclosure of an HDD (e.g., enclosure 140 of HDD 100 of FIGS. 1A and 1). In accordance with aspects of this disclosure, bracket 182 includes liquid crystal polymer. Bracket 182 may have a water level that is less than about 0.08, less than about 0.05 percent, or about 0.02 percent. Bracket 182 may have an outgassing level that is less than about less than about 300 nanograms per gram.

Figure 3:
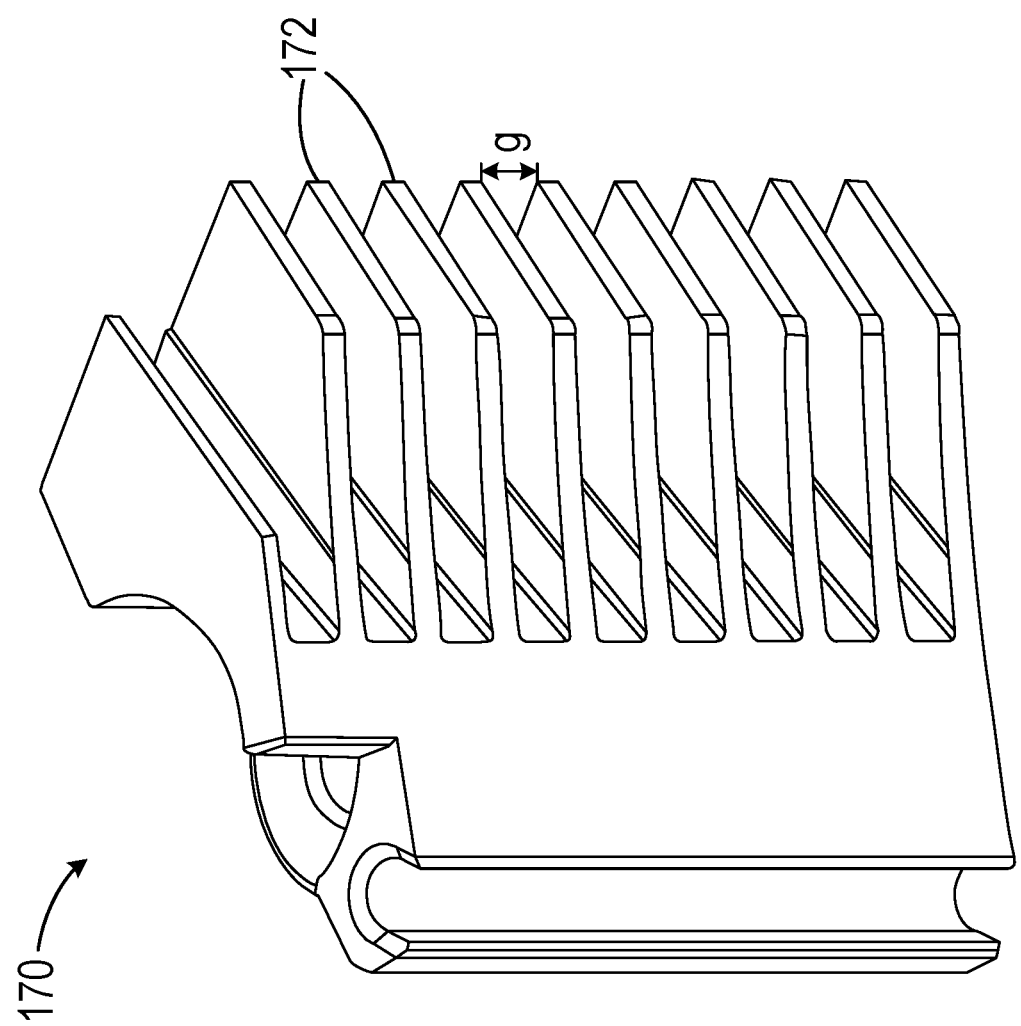
FIG. 3 is a view of an example diverter of a hard disk drive, in accordance with aspects of this disclosure.

FIG. 3 is a view of an example diverter of a hard disk drive, in accordance with aspects of this disclosure. Diverter 170 of FIG. 3 is one example of diverter 170 of FIGS. 1A and 1B. Diverter 170 includes a plurality of fins 172 that are oriented in a stacked configuration and are each separated by a gap g. Each gap g between each fin 172 is structured to accommodate an edge of a magnetic disk (e.g., a magnetic disk 108 of FIGS. 1A and 1B).

In accordance with aspects of this disclosure, diverter 170 includes liquid crystal polymer. Utilizing a liquid crystal polymer resin to construct diverter 170 may enable the formation of small features and tight tolerances that are needed to enable diverter 170 to be disposed proximal to and accommodate edges of a stack of magnetic disks. Producing diverter 170 from a liquid polymer resin in accordance with the aspect of this disclosure may minimize water and outgassing contamination that diverter 170 produces, potentially reducing the impact of diverter 170 on the performance and/or lifetime of an associated HDD. Diverter 170 may have a water level that is less than about 0.08, less than about 0.05 percent, or about 0.02 percent. Diverter 170 may have an outgassing level that is less than about less than about 300 nanograms per gram.

Figure 4:
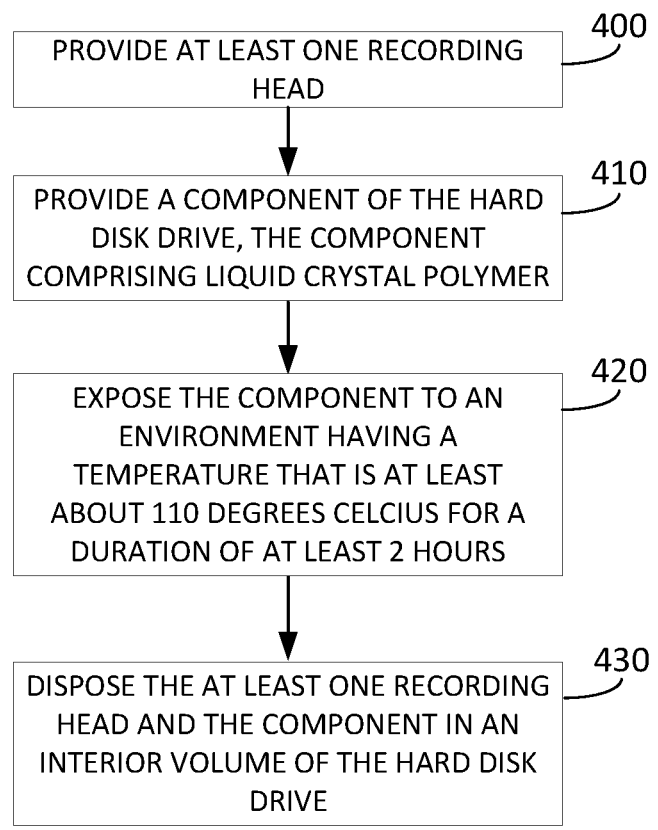
FIG. 4 is a flow diagram illustrating a method for making a hard disk drive, in accordance with aspects of this disclosure.

FIG. 4 is a flow diagram illustrating a method for making a hard disk drive, in accordance with aspects of this disclosure. FIG. 4 is described with reference to HDD 100 of FIGS. 1A and 1B. Steps of FIG. 4 that reference a component may refer to bracket 182 of FIG. 2 or diverter 170 of FIG. 3.

In accordance with aspects of this disclosure, a method of making an HDD includes the steps of providing at least one magnetic recording head (400) (e.g., a heat assisted magnetic recording head); providing a component of HDD, the component comprising liquid crystal polymer (410); exposing the component to an environment having a temperature that is at least about 110 degrees Celsius for a duration of least 2 hours (420); and disposing the at least one magnetic recording head and the component in an interior volume of the HDD (430). The component of steps 410, 420, and 430 may be a bracket, diverter, or another component that is disposed in interior volume of HDD.

The environment of step 420 may be an interior of an oven or other manufacturing tool (e.g., a furnace) configured to bake components of electrical devices. In some examples, the environment of step 420 has a temperature that is from about 110 degrees Celsius to about 160 degrees Celsius. The duration of step 420 may, in some examples, be from about 2 hours to about 10 hours. In one example, the environment of step 420 has a temperature that is from about 140 degrees Celsius to about 160 degrees Celsius and the duration is from about 2 hours to about 6 hours.

Figure 5:
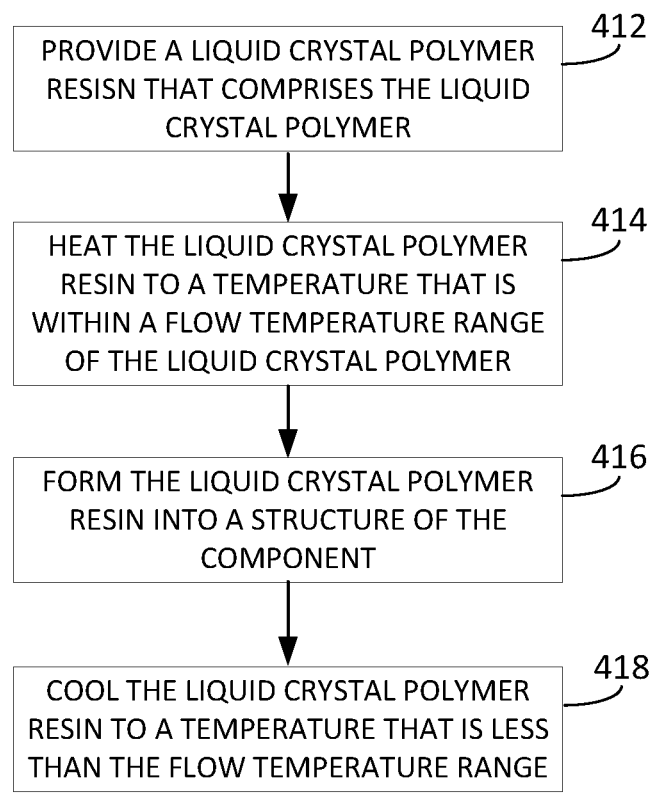
FIG. 5 is a flow diagram illustrating a method for making a hard disk drive, in accordance with aspects of this disclosure.

FIG. 5 is a flow diagram illustrating a method for making a hard disk drive, in accordance with aspects of this disclosure. The method illustrated in FIG. 5 is one example of steps that may be included in step 410 of FIG. 4. FIG. 5 may be described with reference to HDD 100 of FIGS. 1A and 1B. Steps of FIG. 5 that reference a component may refer to bracket 182 of FIG. 2 or diverter 170 of FIG. 3, or another component that is disposed in interior volume 142 of HDD 100.

In accordance with aspects of this disclosure, one example of step 410 of FIG. 4 includes the steps of providing a liquid crystal polymer resin that comprises the liquid crystal polymer (412); heating the liquid crystal polymer resin to a temperature that is within a flow temperature range of the liquid crystal polymer (414); forming the liquid crystal polymer resin into a structure of the component (416); and cooling the liquid crystal polymer resin to a temperature that is less than the flow temperature range (418).

The flow temperature range of the liquid crystal polymer resin may be from about 250 degrees Celsius to about 400 degrees Celsius. In some examples, the liquid crystal polymer resin further includes a filler that is embedded in the liquid crystal polymer. Examples of filler that may be included in the liquid crystal polymer resin include glass, mica, carbon fibers, carbon particles, and graphite.

Figure 6:
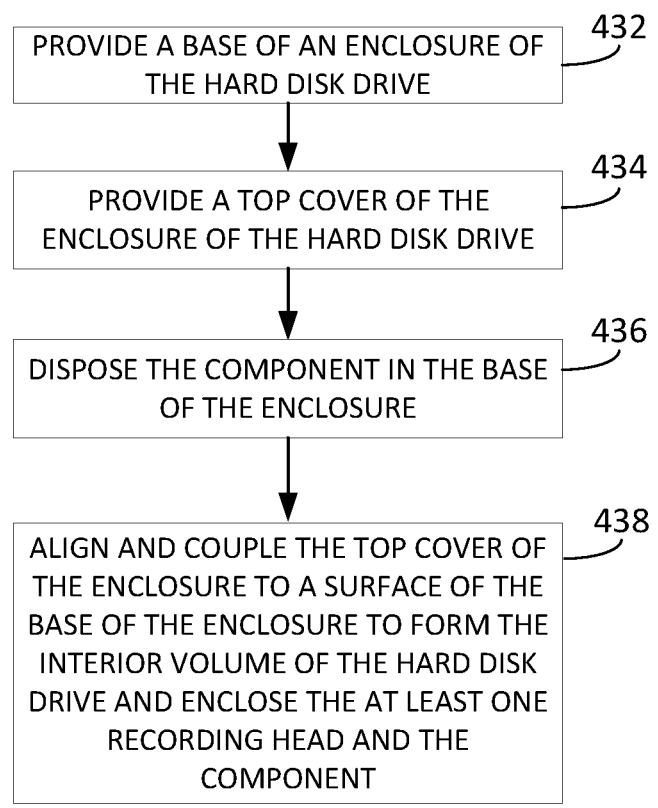
FIG. 6 is a flow diagram illustrating a method for making a hard disk drive, in accordance with aspects of this disclosure.

FIG. 6 is a flow diagram illustrating a method for making a hard disk drive, in accordance with aspects of this disclosure. The method illustrated in FIG. 6 is one example of steps that may be included in step 430 of FIG. 4. FIG. 6 may be described with reference to HDD 100 of FIGS. 1A and 1B. Steps of FIG. 5 that reference a component may refer to bracket 182 of FIG. 2 or diverter 170 of FIG. 3, or another component that is disposed in interior volume 142 of HDD 100.

In accordance with aspects of this disclosure, one example of step 430 of FIG. 4 includes the steps of providing a base of an HDD enclosure (432); providing a top cover of the enclosure (434); disposing the component in the base of the enclosure (436); and aligning and coupling the top cover of the enclosure to a surface of the base 150 to form an interior volume of the HDD and to enclose the at least one magnetic recording head and the component (438).

Various examples have been presented for the purposes of illustration and description. These and other examples are within the scope of the following claims.

What is claimed is:

1. A heat-assisted magnetic recording hard disk drive having an interior volume that encloses a heat-assisted magnetic recording head and a component comprising a liquid crystal polymer having a water level that is less than about 0.08 percent.

2. The heat-assisted magnetic recording hard disk drive of claim 1, wherein the liquid crystal polymer has an outgassing rate that is less than about 300 nanograms per gram.

3. The heat-assisted magnetic recording hard disk drive of claim 1, further comprising a filler that is embedded in the liquid crystal polymer.

4. The heat-assisted magnetic recording hard disk drive of claim 3, wherein the filler comprises at least one of glass, mica, carbon fibers, carbon particles, or graphite.

5. The heat-assisted magnetic recording hard disk drive of claim 1, wherein the component is a bracket.

6. The heat-assisted magnetic recording hard disk drive of claim 1, wherein the component is a diverter.

7. The heat-assisted magnetic recording hard disk drive of claim 1, wherein the interior volume comprises a gas mixture comprising oxygen.

8. The heat-assisted magnetic recording hard disk drive of claim 7, wherein the gas mixture further comprises helium.

9. A method of extending an operating life of a heat-assisted magnetic recording hard disk drive by reducing degradation of a heat-assisted magnetic recording head of the heat-assisted magnetic recording hard disk drive, the method comprising the steps of:
  providing the heat-assisted magnetic recording head;
  providing a component of the heat-assisted magnetic recording hard disk drive, the component comprising liquid crystal polymer;
  exposing the component to an environment having a temperature that is at least about 110 degrees Celsius for a duration of least 2 hours; and
  disposing the heat-assisted magnetic recording head and the component in an interior volume of the heat-assisted magnetic recording hard disk drive by:
    providing a base of an enclosure of the heat-assisted magnetic recording hard disk drive;
    providing a top cover of the enclosure of the heat-assisted magnetic recording hard disk drive:
    disposing the component in the base of the enclosure; and
    aligning and coupling the top cover of the enclosure to a surface of the base of the enclosure to form an interior volume of the heat-assisted magnetic recording hard disk drive and enclose the heat-assisted magnetic recording head and the component.

10. The method of claim 9, wherein the temperature is from about 110 degrees Celsius to about 160 degrees Celsius.

11. The method of claim 9, wherein the duration is from about 2 hours to about 10 hours.

12. The method of claim 9,
  wherein the temperature is from about 140 degrees Celsius to about 160 degrees Celsius, and
  wherein the duration is from about 2 hours to about 6 hours.

13. The method of claim 9, wherein the environment is an interior of an oven configured to bake components of electrical devices.

14. The method of claim 9, wherein the component is a bracket.

15. The method of claim 9, wherein the component is a diverter.

16. The method of claim 9, wherein the step of providing a component of the heat-assisted magnetic recording hard disk drive comprises the steps of:
  providing a liquid crystal polymer resin that comprises the liquid crystal polymer;
  heating the liquid crystal polymer resin to a first temperature that is within a flow temperature range of the liquid crystal polymer;
  forming the liquid crystal polymer resin into a structure of the component;
  cooling the liquid crystal polymer resin to a second temperature that is less than the flow temperature range.

17. The method of claim 16, wherein the liquid crystal polymer resin further comprises a filler that is embedded in the liquid crystal polymer.

18. The method of claim 17, wherein the filler comprises at least one of glass, mica, carbon fibers, carbon particles, or graphite.

19. The method of claim 16, wherein the flow temperature range is from about 250 degrees Celsius to about 400 degrees Celsius.

* * * * *